R. L. DOWNTON.
Process for Treating Bran.
No. 211,977.   Patented Feb. 4, 1879.
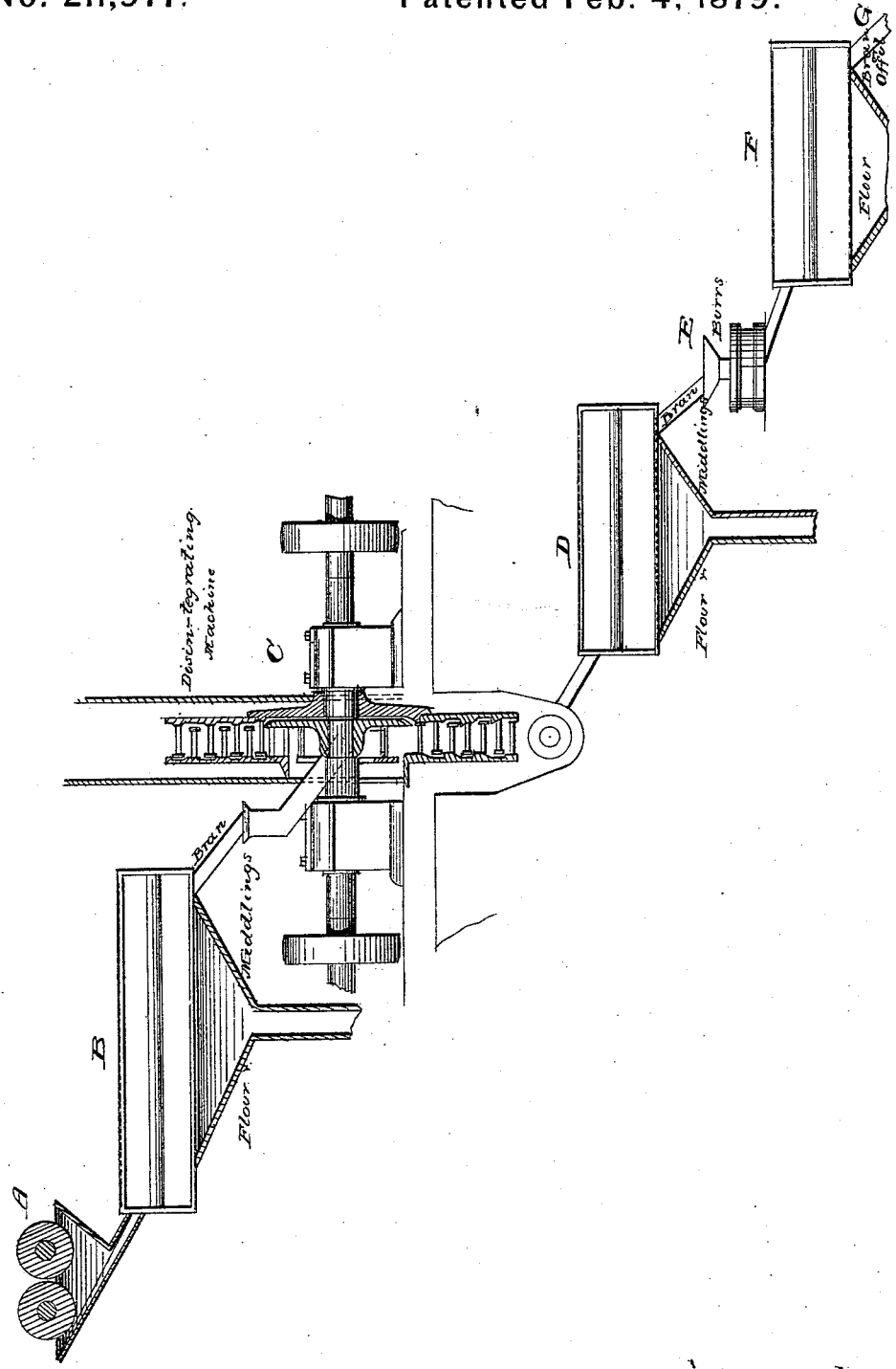

UNITED STATES PATENT OFFICE.

ROBERT L. DOWNTON, OF ST. LOUIS, MISSOURI.

IMPROVEMENT IN PROCESSES OF TREATING BRAN.

Specification forming part of Letters Patent No. 211,977, dated February 4, 1879; application filed September 4, 1878.

*To all whom it may concern:*

Be it known that I, ROBERT L. DOWNTON, of the city and county of St. Louis, and State of Missouri, have invented certain new and useful Improvements in the Process of Treating Bran in the Manufacture of Flour; and I do hereby declare the following to be a full, clear, and exact description of the same.

This invention relates more particularly to the process of treating bran in the manufacture of flour from the system termed "high milling or grinding," wherein the grinding-burrs are arranged at such distances apart as to make a larger per cent. of middlings from the same amount of wheat; and the invention consists in subjecting the bran (after the superfine flour and middlings have been separated therefrom) to the action of crushing-rolls, either smooth or corrugated surfaces, and between which the bran is passed. It is then conveyed to a bolt or bolts for bolting out the flour and middlings separated from the bran by the action of the rolls. The bran is then conveyed to a suitably-constructed disintegrating-machine, for the purpose of further separating particles of flour and middlings still adhering thereto by a slight or gentle friction or rubbing process, and again subjected to further bolting, for removing the flour and middlings separated therefrom by the disintegrating-machine.

I will now briefly describe my method or process of treating the bran, referring, for illustration, to the accompanying drawing, in which the figure represents a sectional view of an apparatus or a series of machines for carrying out said process.

In the drawing, A represents a pair of crushing-rolls, between which the bran from the first grinding is passed, (after the superfine flour and middlings have been separated therefrom.) The bran is then conveyed to a bolt or bolts, B, for bolting out the flour and middlings separated therefrom by the action of the rolls A. The bran is then conveyed to a suitably-constructed disintegrating-machine, C, where it is subjected to a slight or gentle friction or rubbing process, and again rebolted through a bolt or bolts, D, for removing the flour and middlings separated therefrom by the action of the disintegrating-machine. The bran is then reground on the burrs E, and finally rebolted through a bolt or bolts, F, for bolting out the flour separated therefrom by the action of the grinding-burrs E.

By the above-described process of subjecting the bran to the action of the rolls, then bolting out the flour and middlings separated therefrom, and then subjecting the bran to the further action of a disintegrating-machine, and bolting out the flour and middlings separated therefrom, said flour and middlings separated from the bran by the rolls and disintegrating-machine is suited for a high grade of flour, while the flour obtained from the last regrinding and rebolting of the bran is of a lower grade. This last process is solely with a view of making the greatest possible amount of flour from a given amount of wheat.

There may be a few variations in the process of treating the bran, such as subjecting the bran, after passing between the rolls, directly to the action of a disintegrating-machine and bolting it but once before it goes to the grinding-burrs. I prefer, however, to bolt between subjecting the bran to the action of the rolls and the disintegrating-machine. In some cases it may be preferable to purify the bran before passing it to the rolls by subjecting it to the action of a purifier, consisting in winding and screening the bran.

I do not desire to claim, broadly, subjecting bran to the action of rolls and subsequently to the action of grinding-burrs or bran-dusters, as I am aware it has been previously done.

I claim as my invention—

The herein-described process of treating bran in the manufacture of flour, consisting in subjecting the bran to the action of crushing-rolls, then bolting out the flour and middlings separated therefrom by the action of the rolls, then subjecting said bran to the action of a disintegrating-machine, and subsequently bolting out the flour and middlings separated therefrom by the action of the disintegrating-machine, substantially as and for the purpose specified.

ROBERT L. DOWNTON.

Witnesses:
DE WITT C. ALLEN,
N. L. ALLEN.